(12) United States Patent
Becerra et al.

(10) Patent No.: US 8,422,659 B2
(45) Date of Patent: *Apr. 16, 2013

(54) CALL PROCESSING SYSTEM

(75) Inventors: Manuel Becerra, Miami, FL (US);
Charles Thompson, Atlanta, GA (US);
Glenn McMillan, Snellville, GA (US)

(73) Assignee: Assurant, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/583,059

(22) Filed: Aug. 13, 2009

(65) Prior Publication Data

US 2009/0304172 A1 Dec. 10, 2009

Related U.S. Application Data

(63) Continuation of application No. 11/305,058, filed on Dec. 16, 2005, now Pat. No. 7,593,521, which is a continuation of application No. 10/868,752, filed on Jun. 14, 2004, now Pat. No. 7,062,031, which is a continuation-in-part of application No. 10/461,071, filed on Jun. 13, 2003, now Pat. No. 7,050,566.

(51) Int. Cl.
*H04M 3/00* (2006.01)
(52) U.S. Cl.
USPC ................................ 379/265.12; 379/266.08
(58) Field of Classification Search ............. 379/265.12, 379/265.01
See application file for complete search history.

(56) References Cited

U.S. PATENT DOCUMENTS

| | | | |
|---|---|---|---|
| 5,206,903 A | 4/1993 | Kohler et al. | |
| 5,592,542 A | 1/1997 | Honda et al. | |
| 5,684,872 A | 11/1997 | Flockhart et al. | |
| 5,784,452 A | 7/1998 | Carney | |
| 5,825,869 A | 10/1998 | Brooks et al. | |
| 5,857,018 A | 1/1999 | Sumner et al. | |
| 5,903,641 A | 5/1999 | Tonisson | |
| 6,064,731 A | 5/2000 | Flockhart et al. | |
| 6,070,149 A | 5/2000 | Tavor et al. | |
| 6,088,441 A | 7/2000 | Flockhart et al. | |
| 6,163,607 A | 12/2000 | Bogart et al. | |
| 6,173,053 B1 | 1/2001 | Bogart et al. | |
| 6,222,920 B1 | 4/2001 | Walker et al. | |
| 6,233,332 B1 | 5/2001 | Anderson et al. | |

(Continued)

FOREIGN PATENT DOCUMENTS

| | | |
|---|---|---|
| EP | 0 755 144 A2 | 1/1997 |
| EP | 0 949 793 A1 | 10/1999 |
| EP | 1 357 729 | 10/2003 |

*Primary Examiner* — Creighton Smith
(74) *Attorney, Agent, or Firm* — Moss & Barnett

(57) ABSTRACT

A system that is configured for determining the value of one or at least one incoming call and routing the call for processing based on this determined value. In one embodiment, the system routes very low value calls to an automated system for processing, and directs all other calls to human operators for processing. In another embodiment, the system assigns at least one agent to one or more of a plurality of groups of agents based on the agent's past performance in executing a particular task. For example, the highest performing agents at handling a particular type of call are assigned to a first group, and the second highest performing agents at handling this type of call are assigned to a second group. In one embodiment, the most important calls are routed to the first, "highest performing" group for processing, and less important calls are routed to the second group for processing.

24 Claims, 5 Drawing Sheets

U.S. PATENT DOCUMENTS

| | | |
|---|---|---|
| 6,263,066 B1 | 7/2001 | Shtivelman et al. |
| 6,278,777 B1 | 8/2001 | Morley et al. |
| 6,310,951 B1 | 10/2001 | Wineberg et al. |
| 6,314,177 B1 | 11/2001 | Davis et al. |
| 6,324,282 B1 | 11/2001 | McIllwaine et al. |
| 6,356,632 B1 | 3/2002 | Foster et al. |
| 6,389,400 B1 | 5/2002 | Bushey et al. |
| 6,424,709 B1 | 7/2002 | Doyle et al. |
| 6,434,230 B1 | 8/2002 | Gabriel |
| 6,453,038 B1 | 9/2002 | McFarlane et al. |
| 6,459,787 B2 | 10/2002 | McIllwaine et al. |
| 6,480,599 B1 | 11/2002 | Ainslie |
| 6,553,114 B1 | 4/2003 | Fisher et al. |
| 6,556,671 B1 | 4/2003 | Beauvois |
| 6,570,980 B1 | 5/2003 | Baruch |
| 6,798,876 B1 | 9/2004 | Bala |
| 6,856,680 B2 | 2/2005 | Mengshoel et al. |
| 6,912,272 B2 | 6/2005 | Kirk et al. |
| 6,925,493 B1 | 8/2005 | Barkan et al. |
| 7,050,566 B2 * | 5/2006 | Becerra et al. ........... 379/265.12 |
| 7,062,031 B2 * | 6/2006 | Becerra et al. ........... 379/265.01 |
| 7,072,966 B1 | 7/2006 | Benjamin et al. |
| 7,136,448 B1 | 11/2006 | Venkataperumal |
| 7,406,426 B1 * | 7/2008 | Pletz et al. ........................ 708/9 |
| 7,593,521 B2 * | 9/2009 | Becerra et al. ........... 379/265.01 |
| 2001/0011228 A1 | 8/2001 | Shenkman |
| 2002/0087393 A1 | 7/2002 | Philonenko |
| 2002/0110234 A1 | 8/2002 | Walker et al. |
| 2002/0143661 A1 | 10/2002 | Tumulty et al. |
| 2004/0101127 A1 * | 5/2004 | Dezonno et al. ......... 379/265.02 |
| 2004/0103089 A1 | 5/2004 | Lane et al. |
| 2004/0153368 A1 * | 8/2004 | Freishtat et al. ................. 705/26 |
| 2005/0043986 A1 | 2/2005 | McConnell et al. |
| 2005/0100160 A1 * | 5/2005 | Bae .......................... 379/266.01 |
| 2006/0002540 A1 | 1/2006 | Kreiner et al. |
| 2006/0153356 A1 | 7/2006 | Sisselman et al. |
| 2006/0182258 A1 | 8/2006 | Sisselman et al. |
| 2006/0233346 A1 * | 10/2006 | McIlwaine et al. ...... 379/265.02 |
| 2006/0256953 A1 | 11/2006 | Pulaski et al. |
| 2010/0228568 A1 * | 9/2010 | Atlee et al. ......................... 705/3 |

* cited by examiner

CALL PROCESSING SYSTEM

CROSS-REFERENCE TO RELATED APPLICATIONS

This application is a continuation of U.S. Ser. No. 11/305,058 filed on Dec. 16, 2005 now U.S. Pat. No. 7,593,521; which is a continuation of U.S. Ser. No. 10/868,752 filed on Jun. 14, 2004, issued as U.S. Pat. No. 7,062,031 on Jun. 13, 2006; which is a continuation-in-part of U.S. Ser. No. 10/461,071 filed on Jun. 13, 2003, issued as U.S. Pat. No. 7,050,566 on May 23, 2006; all of which are incorporated herein by reference in their entirety.

BACKGROUND OF THE INVENTION

Known systems and methods for processing incoming calls are described in U.S. Pat. Nos. 5,206,903, 5,592,542, 5,903,641 and 6,088,441, which are hereby incorporated by reference. Although these systems have some use in processing incoming calls, there is a need for improved call processing systems. For example, there is a need for an improved call processing system that processes calls more efficiently and effectively than current call processing systems.

SUMMARY OF THE INVENTION

A call processing system according to one embodiment of the invention is configured for: (1) determining an expected economic value that is expected to be derived from performing one or more tasks in connection with an incoming call; (2) assessing a priority of the incoming call based on the expected economic value; (3) using the assessed priority to determine whether to route the incoming call to an automated call processing system; and (4) in response to determining to route the incoming call to an automated call processing system, routing the call to the automated processing system.

A call processing system according to a further embodiment of the invention is configured for: (1) receiving an incoming call; (2) estimating an expected lifetime value that is predicted to be derived from a caller associated with the incoming call; (3) assessing a priority of an incoming call based, at least in part, on the estimated expected lifetime economic value; (4) based on the assessed priority, determining whether to route the incoming call to an automated call processing system; and (5) in response to determining to route the incoming call to the automated call processing system, routing the incoming calf to the automated call processing system for processing. In one embodiment of the invention, the system is further configured for: (6) determining an estimated impact that performing one or more tasks in connection with the incoming call would have on the estimated expected lifetime economic value. In this embodiment, the step of assessing a priority of the incoming call is based, at least in part, on this estimated impact.

A call processing system according to a further embodiment of the invention is configured for: (1) receiving data related to an incoming call; (2) assigning a priority value to the incoming call based on the data; and (3) using this priority value to determine whether to route the incoming call to a live agent or to an automated call processing system for handling. In various embodiments of the invention, the priority value is based, at least in part, on: (A) an expected lifetime value that is predicted to be derived from a caller associated with the incoming call; and/or (B) an expected lifetime value that is predicted to be derived from an account associated with the incoming call.

A call processing system according to another embodiment of the invention is configured for: (1) receiving a call from a customer, the call being related to the cancellation of a first service; (2) determining whether it would be beneficial to attempt to persuade the customer to replace the first service with a particular product or second service; and (3) at least partly in response to determining that it would not be beneficial to attempt to persuade the customer to replace the first service with a particular product or second service, routing the call to an automated call processing system. In various embodiments of the invention, the step of determining whether it would be beneficial to attempt to persuade the customer to replace the first service with a particular product or second service comprises: (1) assessing whether it would be more profitable to have the customer retain the first service than to purchase the particular product or second service; (2) assessing whether an account associated with the call has been profitable in the past; and/or (3) estimating the chances of persuading the customer to replace the first service with the particular product or the second service.

A call processing system according to a further embodiment of the invention is configured for: (1) processing calls from one or more customers related to a debt cancellation contract; and (2) for at least a particular one of the calls, allowing a customer associated with the particular call to cancel the debt cancellation contract, via the particular call, substantially without the assistance of a human operator.

A call processing system according to another embodiment of the invention is configured for: (1) processing calls from one or more customers related to a debt deferment contract; and (2) for at least a particular one of the calls, allowing a customer associated with the particular call to cancel the debt deferment contract, via the particular call, substantially without the assistance of a human operator.

A call processing system according to a further embodiment of the invention is configured for: (1) receiving information related to an incoming call; (2) using the information to determine whether it would be beneficial to have a human representative handle the incoming call; and (3) in response to determining that it would not be beneficial to have a human representative handle the incoming call, routing the call to an automated call processing system for handling. In one embodiment, the incoming call is a first incoming call that is in a queue with at least a second incoming call, and the step of determining whether it would be beneficial to have a human representative handle the first incoming call comprises: (1) using at least one statistical model to estimate the expected future profitability of a first caller who is associated with the first incoming call (in one embodiment, the at least one statistical model is based on a plurality of variables); (2) using the at least one statistical model to estimate the expected future profitability of a second caller who is associated with the second incoming call; (3) comparing the expected future profitability of the first caller with the expected future profitability of the second caller; (4) at least partially in response to determining that the expected future profitability of the second caller is greater than the expected future profitability of the first caller, determining that it would not be beneficial to have a human representative handle the first incoming call.

A call processing system according to yet another embodiment of the invention is configured for: (1) assessing the importance of an incoming call, the call being made by a particular customer; and (2) routing the incoming call to a particular group of agents for processing based on the importance of the incoming call. In this embodiment, at least one particular agent within the group of agents has been assigned to the group of agents based on the particular agent's past performance in completing one or more particular tasks. In various embodiments of the invention, the "one or more particular tasks" includes persuading one or more customers not to cancel a service, and/or persuading one or more customers to purchase a particular product or service.

A call processing system according to a further embodiment of the invention is configured for: (1) assessing the importance of an incoming call; and (2) routing the incoming call to a particular group of agents for processing based on the importance of the incoming call, wherein at least one particular agent within the group of agents has been assigned to the group of agents based, at least in part, on the particular agent's saved revenue rate performance.

A call processing system according to yet another embodiment of the invention is configured for: (1) assessing the importance of an incoming call; and (2) routing the incoming call to a particular group of agents for processing based on the importance of the incoming call, wherein at least one particular agent within the group of agents has been assigned to the group of agents based, at least in part, on the particular agent's sales rate performance.

A call processing system according to another embodiment of the invention is configured for: (1) assessing the importance of an incoming call; and (2) routing the incoming call to a particular group of agents for processing based on the importance of the incoming call, wherein at least one particular agent within the group of agents has been assigned to the group of agents based, at least in part, on the particular agent's sold revenue rate performance.

A method of routing a call for processing according to a particular embodiment of the invention comprises: (1) identifying, from a plurality of agents, a group of one or more highest performing agents who are among the highest performing agents within the plurality of agents at performing at least one task; (2) assessing the value of a particular call; and (3) determining whether to route, the particular call to the group of "highest performing agents" for processing based on the assessed value of the particular call. In one embodiment of the invention, this method further includes: (4) identifying, from the plurality of agents, a group of one or more "lowest performing" agents who are among the lowest performing agents within the plurality of agents at performing one or more tasks; and (5) determining whether to route the particular call to the group of "lowest performing agents" for processing based on the assessed value of the particular call.

A method of routing a call for processing according to a further embodiment of the invention comprises: (1) identifying, from a plurality of agents, a group of one or more "lowest performing" agents who are among the lowest performing agents within the plurality of agents at performing one or more tasks; (2) assessing the value of a particular call; and (3) determining whether to route the particular call to the group of "lowest performing agents" for processing based on the assessed value of the particular call.

A method of routing calls according to a further embodiment of the invention comprises: (1) assigning a first performance rating to a first agent; (2) assigning a second, performance rating to a second agent; (3) assigning a third performance rating to a third agent; (4) in response to the first performance rating being above a pre-determined first threshold value, assigning the first agent to a first group of agents; (4) in response to the second performance rating being below a pre-determined second threshold value, assigning the second agent to a second group of agents; (5) in response to the third performance rating being below the first threshold value and above the second threshold value, assigning the third agent to a third group of agents; (6) determining a value of a call; and (7) routing a call to a selected one of the first, second, and third groups of agents based, at least in part, on the value of the call.

A method of routing a correspondence for processing according to one embodiment of the invention comprises: (1) identifying, from a plurality of agents, a group of one or more "higher performing" agents who are among the highest performing agents within the plurality of agents at performing at least one task; (2) assessing the value of a particular correspondence; and (3) determining whether to route the particular correspondence to the group of "higher performing agents" for processing based on the assessed value of the particular correspondence.

A method of routing a call for processing according to one embodiment of the invention comprises the steps of: (1) assessing the past performance of a first agent in performing one or more tasks; (2) assessing the past performance of a second agent in performing the one or more tasks; (3) comparing the past performance of the first agent with the past performance of the second agent; (4) in response to determining that the past performance of the first agent is better than the past performance of the second agent: (A) assigning the first agent to a first group of agents, and (B) assigning the second agent to a second group of agents; (5) assigning a first call value to a first call in a queue of calls; (6) assigning a second call value to a second call in the queue of calls; (7) comparing the first call value with the second call value; (8) determining whether the first agent is available to handle the first call; (9) in response to determining that the first call value is greater than the second call value and that the first agent is available to handle the first call, routing the first call to the first agent for handling; and (10) in response to determining that the first call value is greater than the second call value and that the first agent is not available to handle the first call, routing the first call to the second agent for handling. In one embodiment, the method further includes the step of: (11) in response to determining that the first call value is greater than the second call value and that neither the first agent nor the second agent is available to handle the first call, routing the first call to an automated call processing system (or to a third agent) for handling.

A method of routing a call for processing according to a further embodiment of the invention includes the steps of: (1) assessing the past performance of a first agent in performing one or more tasks; (2) assessing the past performance of a second agent in performing the one or more tasks; (3) comparing the past performance of the first agent with the past performance of the second agent; (4) for a first call in a queue of calls, assessing a first estimated benefit associated with attempting to persuade a first customer associated with the first call not to cancel a particular service; (5) for a second call in the queue of calls, assessing a second estimated benefit associated with attempting to persuade a second customer associated with the second call not to cancel a particular service; (6) in response to determining: (A) that the first estimated benefit is greater than the second estimated benefit; (B) that the past performance of the first agent is better than the past performance of the second agent; and (C) that the first agent is available to handle the first call, routing the first call to the first agent for handling. In one embodiment, the method further comprises: (7) in response to determining that the first agent is not available to handle the first call, routing the first call to the second agent for handling. In one embodiment, the method comprises determining whether routing the first call to the first agent for handling would satisfy a predetermined average speed of answer requirement, and the step of routing the first call to the first agent for handling is executed at least in part in response to determining that routing the first call to the first agent for handling would satisfy the pre-determined average speed of answer requirement.

A call processing system according to another embodiment of the invention is configured for: (1) determining which particular one of a plurality of calls in a queue of calls is the most important of the calls; (2) assessing the past performance of a first agent in completing one or more tasks; (3) assessing the past performance of a second agent in completing the one or more tasks; (4) comparing the past performance of the first agent with the past performance of the second agent; (5) based on the comparing step, determining that the past performance of the first agent was better than the past performance of the second agent; (6) determining whether the first agent is available to take the most important call; (7) in response to determining that the first agent is available to take the most important call, routing the most important call to the first agent for handling; and (8) in response to determining that the first agent is not available to take the most important call, routing the most important call to the second agent for handling.

A call processing system according to another embodiment of the invention is configured for: (1) assessing the past performance of a third agent in completing the one or more tasks; (2) comparing the past performance of the third agent with the past performance of the first agent and the past performance of the second agent; (3) based on the comparing step, determining that the past performance of the third agent was not as good as the past performance of the first agent, and was also not as good as the past performance of the second agent; (4) determining whether the second agent is available to take the most important call; (5) in response to determining that the first and second agents are not available to take the most important call, routing the most important call to the third agent for handling.

A call processing system according to yet another embodiment of the invention is configured for: (1) determining which particular one of a plurality of calls in a queue of calls is the most important of the calls; (2) assessing the past performance of a first agent in completing one or more tasks; (3) assessing the past performance of a second agent in completing the one or more tasks; (4) comparing the past performance of the first agent with the past performance of the second agent; (5) based on the comparing step, determining that the past performance of the first agent was better than the past performance of the second agent; (6) in response to determining that the past performance of the first agent was better than the past performance of the second agent, routing the most important call to the first agent for handling; (7) in response to the first agent not handling the call within a pre-determined period of time after the most important call has been routed to the first agent for handling, re-routing the most important call to the second agent for handling.

A call processing system according to yet another embodiment of the invention is configured for: (1) receiving a call from a customer, the call being related to the purchase of a product or service or potential purchase of a product or service; (2) determining whether it would be beneficial to attempt to persuade the customer to purchase the product or service; and (3) in response to determining that it would not be beneficial to attempt to persuade the customer to purchase the product or service, routing the call to an automated call processing system for handling.

BRIEF DESCRIPTION OF THE DRAWINGS

Figure 1:
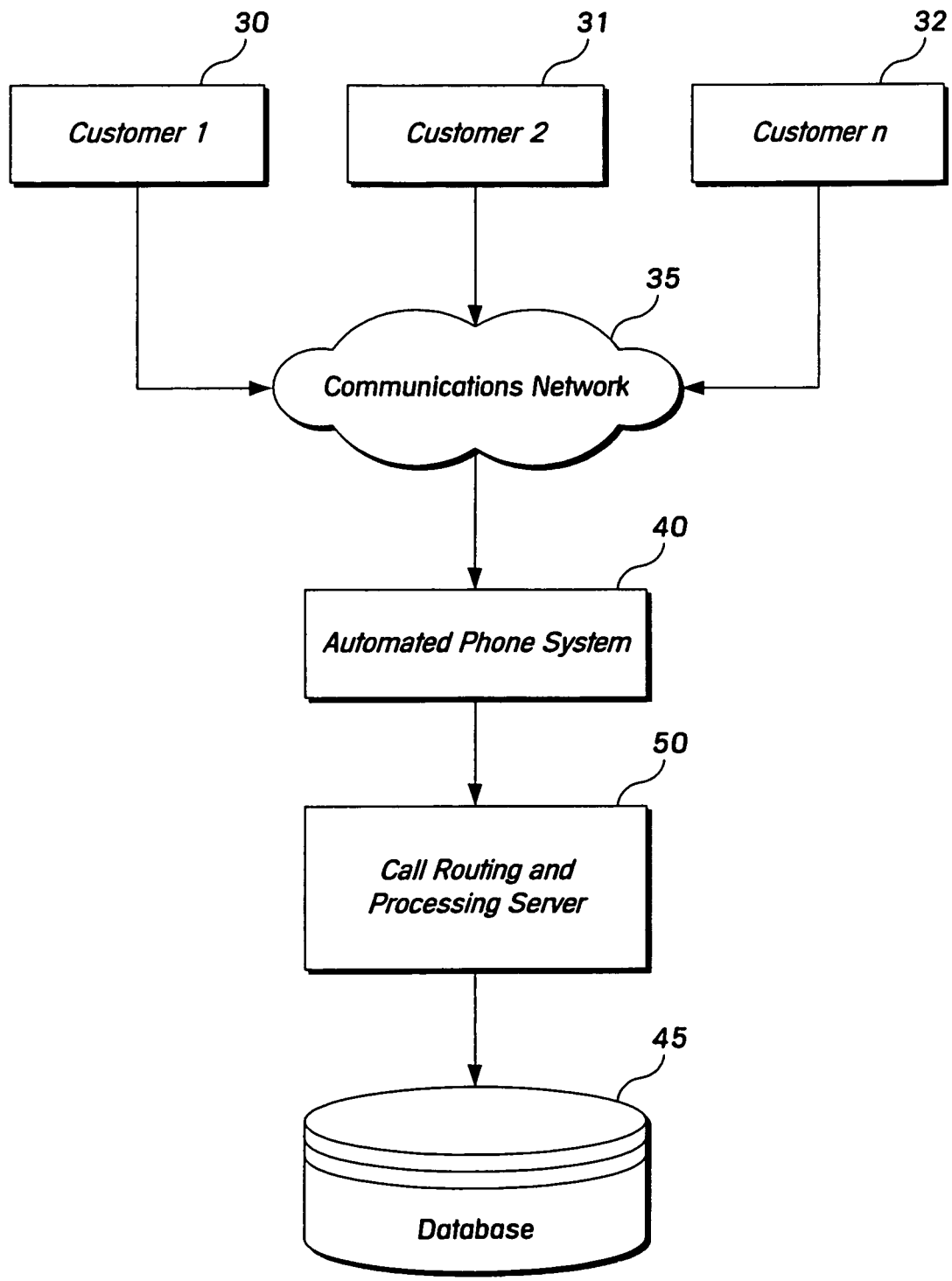

Having thus described the invention in general terms, reference will now be made to the accompanying drawings, which are not necessarily drawn to scale, and wherein:

FIG. 1 is a block diagram of a call processing system according to one embodiment of the invention.

Figure 2:
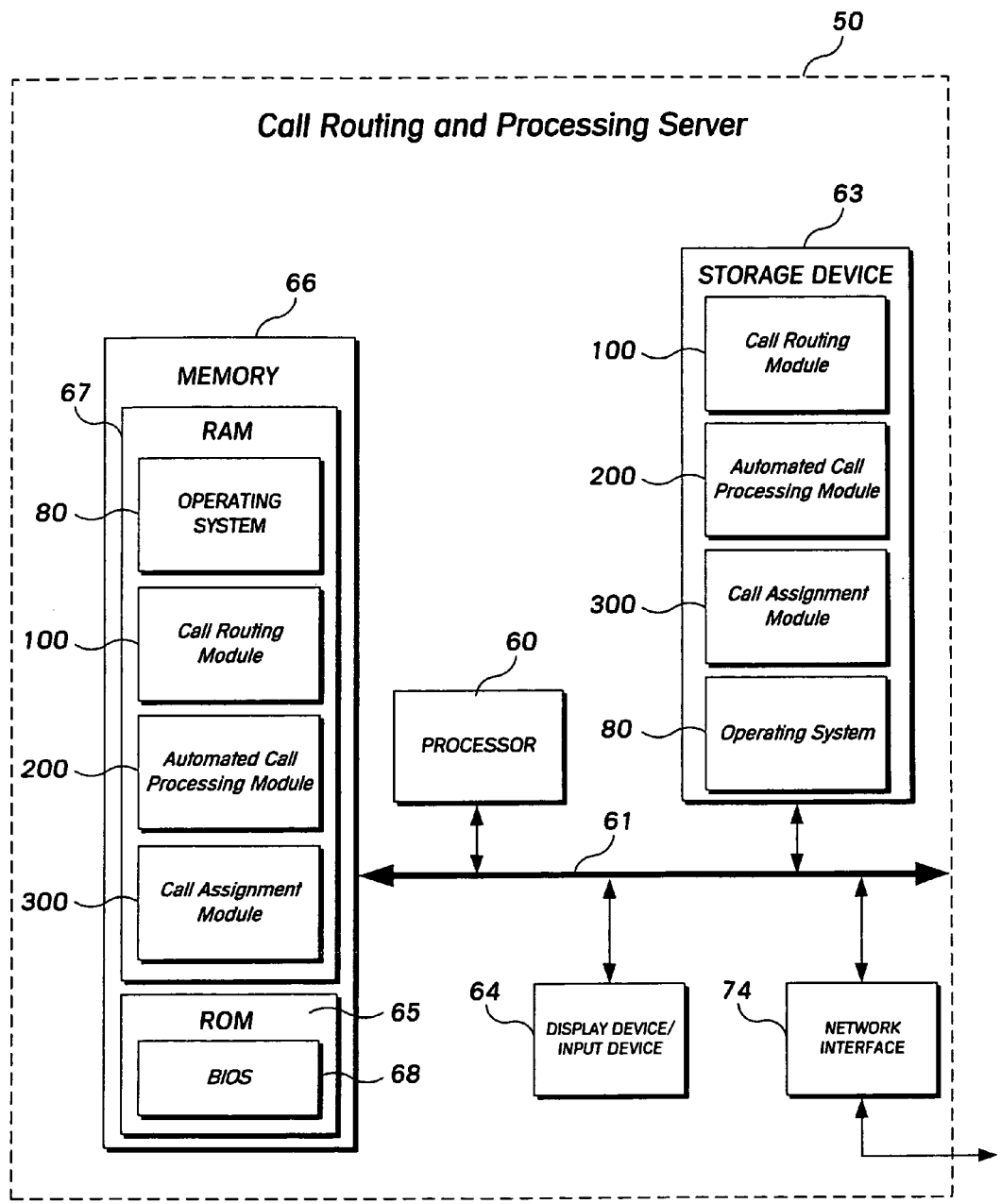

FIG. 2 is a block diagram of a call routing and processing server according to one embodiment of the invention.

Figure 3:
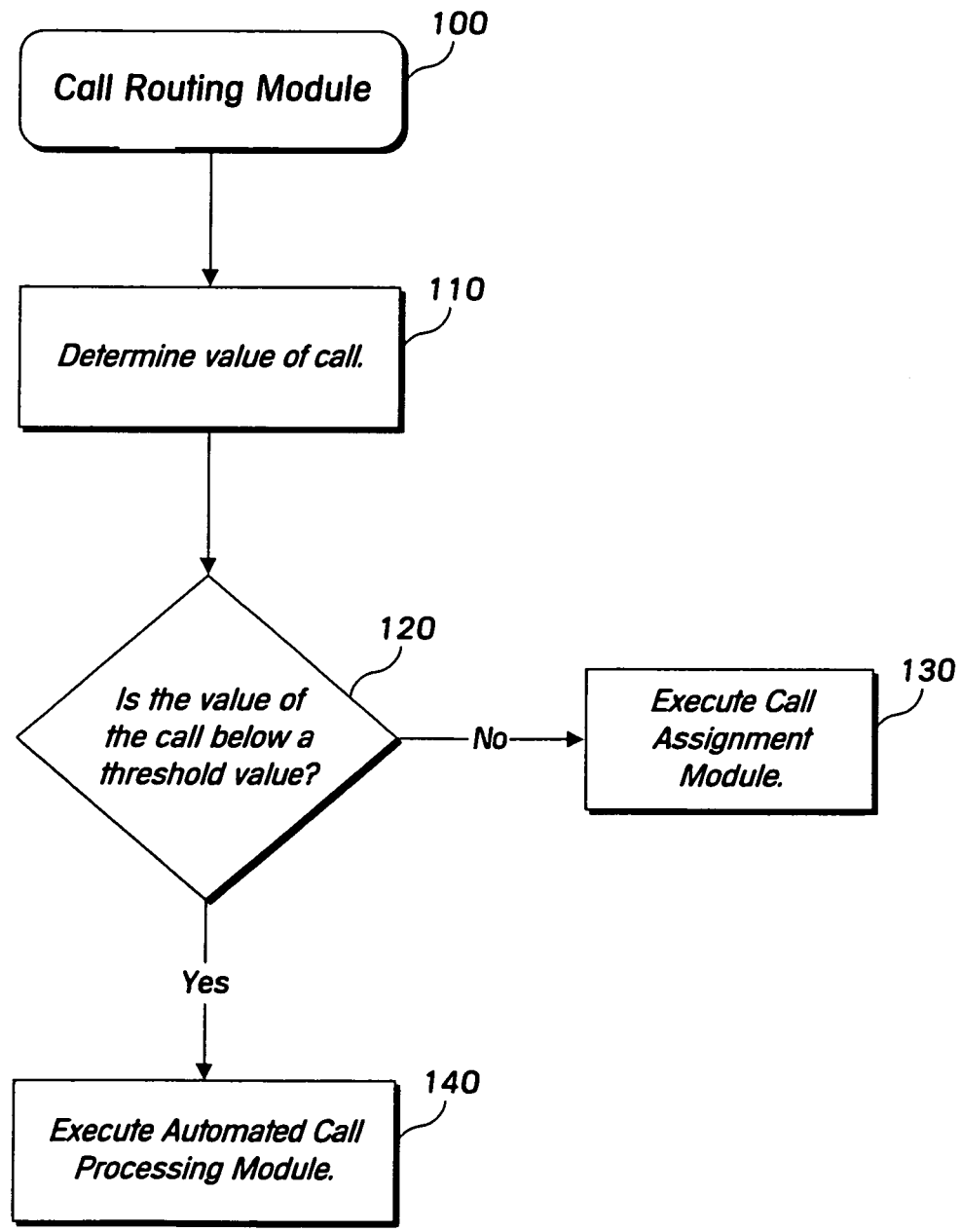

FIG. 3 is a flow chart that corresponds to a call routing module according to one embodiment of the invention.

Figure 4:
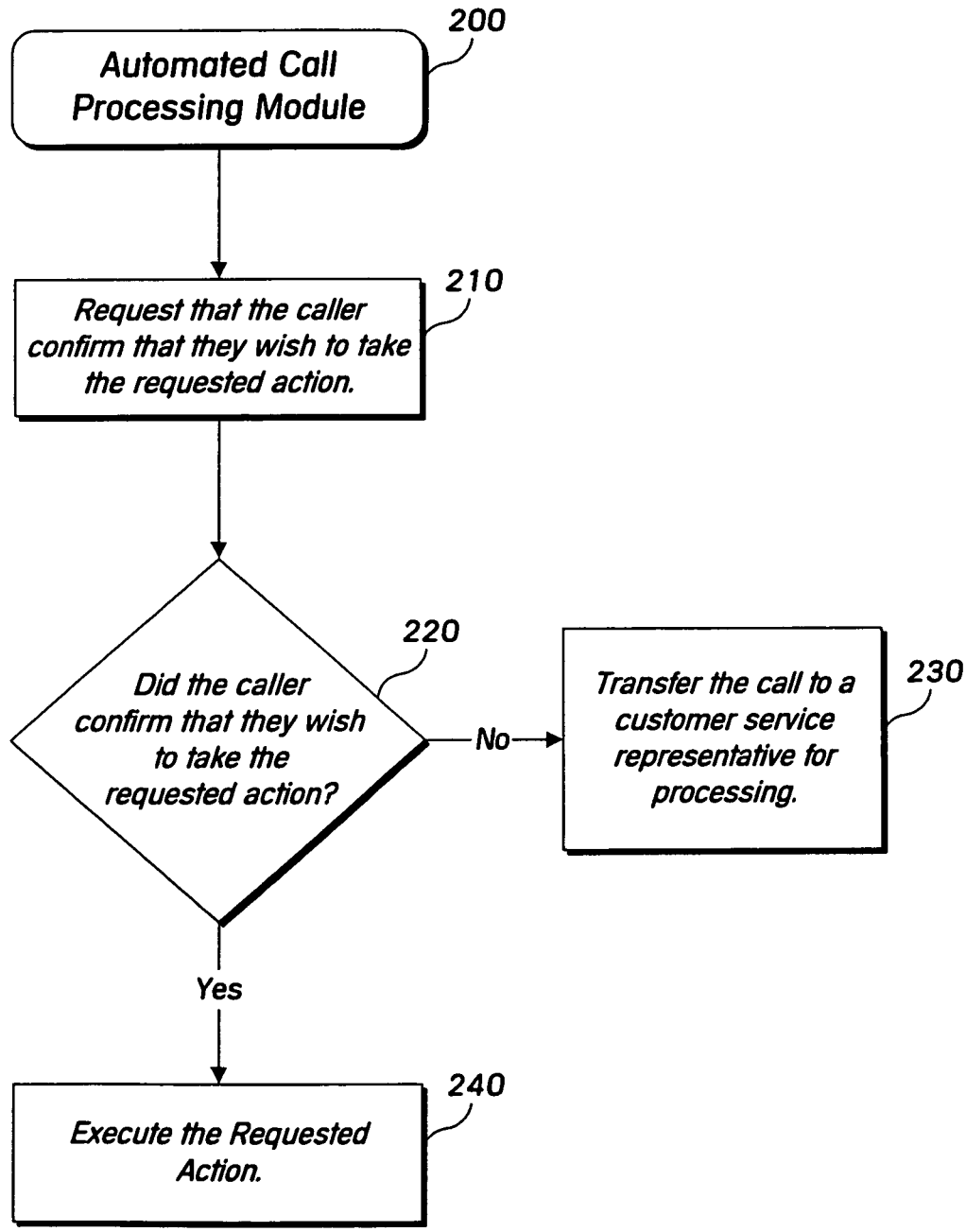

FIG. 4 is a flow chart that corresponds to an automated call processing module according to one embodiment of the invention.

Figure 5:
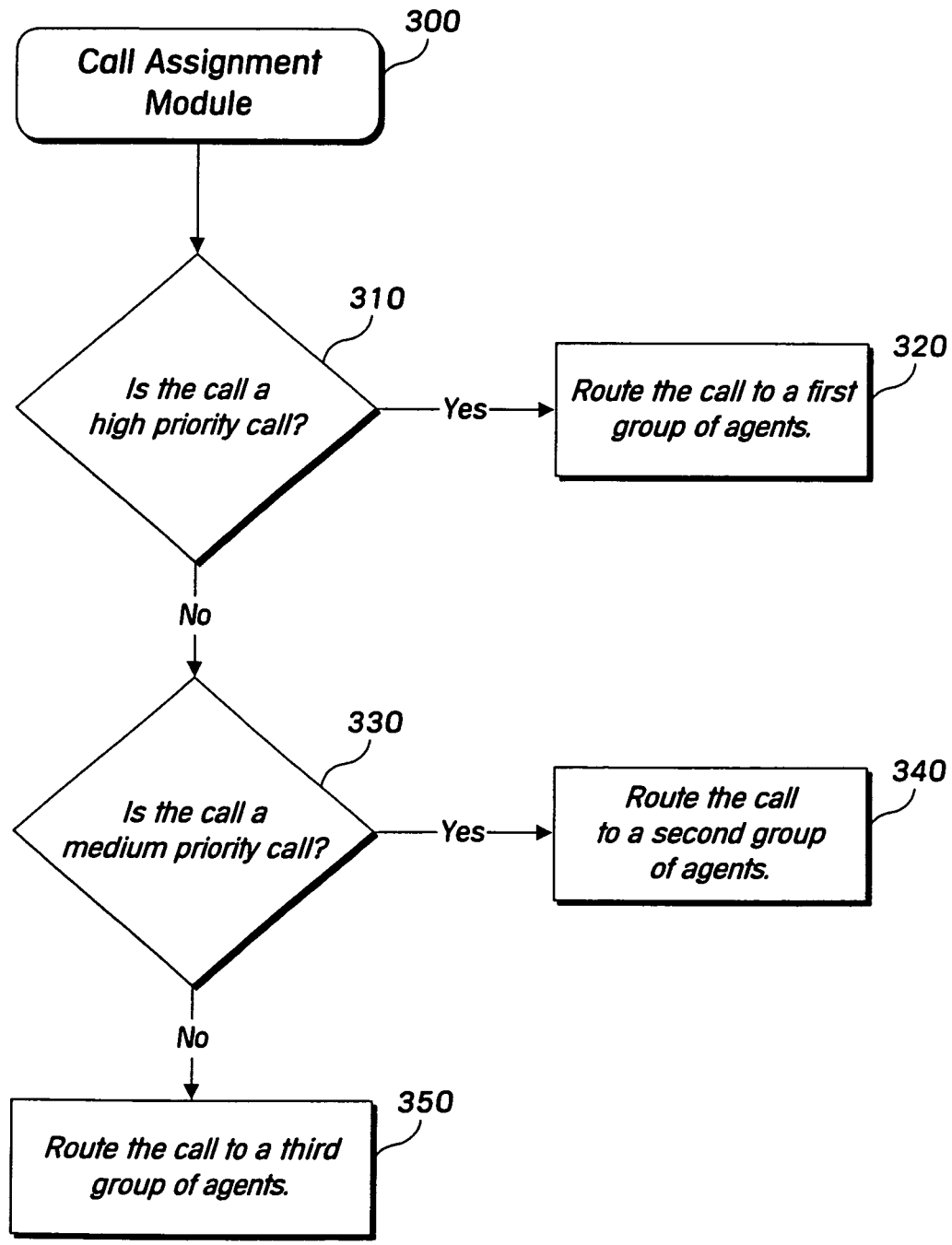

FIG. 5 is a flow chart that corresponds to a call assignment module according to one embodiment of the invention.

DETAILED DESCRIPTION OF THE INVENTION

The present invention now will be described in greater detail with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the relevant field. Like numbers refer to like elements throughout.

As will be appreciated by one skilled in the relevant field, the present invention may be embodied, for example, as a method, a data processing system, or a computer program product. Accordingly, the present invention may take the form, for example, of an entirely hardware embodiment, an entirely software embodiment, or an embodiment having both software and hardware components. Furthermore, the present invention may take the form of a computer program product on a computer-readable storage medium having computer-readable program code embodied in the storage medium. Any suitable computer-readable storage medium may be utilized including hard disks, CD-ROMs, optical storage devices, or magnetic storage devices.

The present invention is described below with reference to block diagrams and flowchart illustrations of methods, apparatuses (e.g., systems) and computer program products according to various embodiments of the invention. It will be understood that each block of the flowchart illustrations, and combinations of blocks of these flowchart illustrations can be implemented by computer program instructions. These computer program instructions may be loaded onto a general purpose computer, special purpose computer, or other programmable data processing apparatus to produce a machine to implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions for implementing the functions specified in the various flowchart block or blocks. The computer program instructions may also be loaded onto a computer or other programmable data processing apparatus to cause a series of operational steps to be performed on the computer or other programmable apparatus to produce a computer implemented process. In such an embodiment of the invention, the instructions that are executed on the computer or other programmable apparatus may serve to implement the functions specified in the flowchart block or blocks.

Accordingly, blocks of the block diagrams and flowchart illustrations and the text of this patent application support systems and methods for performing the specified functions, as well as computer readable media storing computer-executable instructions for performing the specified functions. It will also be understood that each block within the flowchart illustrations, and combinations of blocks within the flowchart illustrations, can be implemented by special purpose hardware-based computer systems that perform the specified functions or steps, or by combinations of computer hardware and computer instructions.

In one embodiment of the invention, the various system-implemented steps described within this application are implemented by a computer processor within a computer system. In a particular embodiment of the invention, this computer processor is coupled to a memory.

System Architecture

FIG. 1 shows a block diagram of a call processing system 10 according to one embodiment of the present invention. As may be understood from this figure, this exemplary call processing system 10 includes a Call Routing and Processing Server 50, a database 45, an automated phone system 40 (also known as an "automated attendant"), and one or more communications networks 35 for facilitating communication between one or more customers 30, 31, 32 and both the automated phone system 40 and the Call Routing and Processing Server 50. These one or more communications networks 35 may include any of a variety of types of networks such as a public switch telephone network (PSTN), the Internet, a private intranet, or any other type of suitable network. In one embodiment of the invention shown in FIG. 1, the communications network 35 comprises a public switch telephone network (PSTN).

FIG. 2 is a block diagram of an exemplary embodiment of the Call Routing and Processing Server 50 of FIG. 1. The Call Routing and Processing Server 50 includes a processor 60 that communicates with other elements within the Call Routing and Processing Server 50 via a system interface or bus 61. Also included in the Call Routing and Processing Server 50 is a display device/input device 64 for receiving and displaying data. This display device/input device 64 may be, for example, a keyboard or pointing device that is used in combination with a monitor. The Call Routing and Processing Server 50 further includes memory 66, which preferably includes both read only memory (ROM) 65 and random access memory (RAM) 67. The Call Routing and Processing Server's ROM 65 is used to store a basic input/output system 68 (BIOS) that contains the basic routines that help to transfer information between elements within the Call Routing and Processing Server 50.

In addition, the Call Routing and Processing Server 50 includes one or more storage devices 63, such as a hard disk drive, a floppy disk drive, a CD Rom drive, or optical disk drive, for storing information on one or more types of computer-readable media, such as hard disks, removable magnetic disks, or CD-ROM disks. As will be understood by one of ordinary skill in this field, each of these storage devices 63 is connected to the system bus 61 via an appropriate interface. The storage devices 63 and their associated computer-readable media provide nonvolatile storage for the Call Routing and Processing Server 50.

It should be understood that the computer-readable media described above may include any other suitable type of computer-readable media known in the art. Such media include, for example, magnetic cassettes, flash memory cards, digital video disks, and Bernoulli cartridges.

A number of program modules may be stored by the various storage devices and within the server's RAM 67. Such program modules include an operating system 80, a Call Routing Module 100, an Automated Call Processing Module 200, and a Call Assignment Module 300. The Call Routing Module 100, Automated Call Processing Module 200, and Call Assignment Module 300 control certain aspects of the operation of the Call Routing and Processing Server 50 with the assistance of the processor 60 and an operating system 80.

The Call Routing and Processing Server 50 also includes a network interface 74 for interfacing and communicating with other elements of a computer network. It will be appreciated by one of ordinary skill in this field that one or more of the Call Routing and Processing Server 50 components may be located geographically remotely from other Call Routing and Processing Server 50 components. Furthermore, one or more of the server's components may be combined, and additional components for performing functions described herein may be included in the Call Routing and Processing Server 50.

Statistical Modeling Techniques Used by the System

Various embodiments of the present invention may use known statistical modeling techniques to, for example: (1) estimate the future economic value of an account; (2) estimate the future economic value of a business relationship with a particular individual; (3) estimate the probability that a particular event will occur (e.g., that a particular agent will be able to "save" a particular call, or that a particular agent will be successful in cross-selling a particular product to a particular customer.) As will be understood by one skilled in the relevant field, known "data mining" techniques may be used to derive these estimates. Various exemplary data mining techniques that may be used for this purpose are described in "Data Mining Cookbook: Modeling Data for Marketing, Risk and Customer Relationship Management" by Olivia Parr Rudd (John Wiley & Sons, 2001), which is hereby incorporated by reference.

DEFINITIONS

For the purposes of this disclosure, a "saved call" occurs when an agent persuades a customer not to cancel a service or policy, or when an agent persuades a customer to purchase an alternative service, product or policy. For example, if a customer calls to cancel a particular insurance policy and an agent convinces the customer to not cancel the policy, the agent is credited with saving the call. Similarly, if a customer calls to cancel a particular service and an agent convinces the customer to purchase an alternative service or a different combination of benefits and price for the same service, then the agent is also credited with saving the call.

Also, for the purposes of this disclosure, a "group" of agents may include a plurality of agents or a single agent. As will be understood by one skilled in the relevant field, the number of agents within a particular group of agents may vary over time. For example, in a particular situation, a particular group of agents may consist of a first agent. However, in another situation in which more agents are needed to handle the responsibilities of that same group, the group may include two, three, or more agents.

In addition, for the purposes of this disclosure, the term "a call related to the cancellation of a product or service" is a call that is related to the cancellation or potential cancellation of a product or service. Such calls include calls from customers requesting the cancellation of a product or service.

Overview of System Functionality

A system and method according to one embodiment of the invention is configured for routing and processing incoming telephone calls. For example, one embodiment of the invention is specifically configured for routing incoming telephone calls from customers who wish to cancel an existing insurance policy. However, as will be understood by one skilled in the related field, various different embodiments of the invention may be applied to routing many different types of telephone calls or other types of correspondence within many different industries. For example, various different embodiments of the invention may be applied to handling calls involving customer complaints, insurance claims, repair requests, or other types of calls or correspondence.

As noted above, a particular embodiment of the invention is configured for routing telephone calls from customers who wish to cancel an existing insurance policy. In this embodiment of the invention, incoming calls are first routed to an automated phone system 40. This automated phone system 40 preferably determines the insurance policy at issue and verifies, in a manner known in the art, that the caller has the authority to make changes to the policy. For example, in one embodiment of the invention, the system prompts the user to enter their insurance policy number along with information that only the account holder (or someone closely associated with the account holder) would know. Such information may include, for example, a PIN number or the account holder's mother's maiden name. Alternatively, if the account holder is calling from their home phone, the system may use the account holder's home phone number to retrieve their account information from a database.

Call Routing Module

Once the system has identified the caller's account number and verified that the caller has the authority to modify the account, the system executes a Call Routing Module 100, an example of which is depicted in FIG. 3. As may be understood from this figure, when executing the call routing module 100, the system first executes Step 110 where it determines the value of the call.

As will be understood by one skilled in the related field, any appropriate technique may be used to assign a value to a particular incoming call. Such techniques may take into account, for example, various factors such as one or more of the following factors: (1) the monetary value of an account that is the subject of the call; (2) the amount of time that the account has been open; (3) the payment history associated with the account; (4) the customer history associated with the account (for example, if the customer tends to complain persistently, the customer's account, and therefore the call, may be of less value than a similar account for a customer that does not frequently complain); (5) future indicators of the profitability of the account (e.g., the predicted lifetime value of the account, or the predicted lifetime value that is predicted to be derived from a caller associated with the call—as will be understood by one skilled in the relevant field, such future indicators of profitability may be based on such factors as the caller's historical credit limit and credit balance activity, and the fees that a company maintaining the account derives from maintaining the account); (6) the predicted impact that an agent performing one or more tasks will have on the value of an account associated with the call (e.g., the predicted impact that an agent "saving" the call would have on the predicted lifetime value of an account associated with the call); (7) the predicted impact that an agent performing one or more tasks will have on the value that is predicted to be derived from a caller associated with the call (e.g., the predicted impact that an agent "saving" the call would have on the value that is predicted to be derived from a caller associated with the call); (8) one or more manually-assigned call priority indicators, and (9) the predicted nature of the incoming call.

In one embodiment of the invention, one or more of the above factors are used to assign a numeric value rating to each incoming call. For example, in one embodiment of the invention, each call is assigned a numeric value rating of 0 through 10, where 0 corresponds to a call of no value and 10 corresponds to an extremely valuable call. As will be understood by one skilled in the related field, a variety of different systems may be used for rating the various calls. These systems may involve, for example, assigning a numeric rating to the calls or simply associating the calls with a non-numerical priority indicator, such as "high-value", "medium value", "low value" or "no value".

After the system has determined a value of the call at Step 110, the system then proceeds to Step 120 where it determines whether the determined value of the call is below a predetermined threshold value. In one embodiment of the invention, the system does this by comparing the determined call value (which may, for example, be a numeric value) with a predetermined threshold value (which may also be a numeric value). If the determined call value is below the threshold value, the system proceeds to Step 140, where it executes an Automated Call Processing Module 140. In one embodiment, the Automated Call Processing Module 140 allows the caller to take a requested action (such as canceling an insurance policy) without assistance from a human representative. Thus, in one embodiment of the invention, the system is configured to allow callers to cancel very low value insurance policies or services in an automated manner without first speaking with a customer service representative.

If the system determines, at Step 120, that the value of the call is not below the pre-determined threshold value, the system proceeds to Step 130 where it executes a Call Assignment Module 130. As discussed in greater detail below, the Call Assignment Module 300 routes the call to an appropriate group of customer service representatives (i.e., "agents") for processing. Thus, in one embodiment of the invention, the system is configured to require callers to speak to a customer service representative before canceling insurance policies or debt protection contracts that are not regarded as "very low value" policies.

As will be understood by one skilled in the relevant field in light of this disclosure, the above techniques may be used in many different situations. For example, in one embodiment of the invention, the system is configured for receiving an incoming call (e.g., a call regarding the cancellation of a product or service, or a call related to the purchase of a product or service), and determining (e.g., based on one or more of the factors listed above) whether it would be worthwhile to have a human agent attempt to sell the caller a particular product or service (e.g., an alternative product or service, or the same product or service that the caller is calling to potentially cancel or purchase). If so, the system would route the call to an appropriate human agent for handling. If not, the system would route the call to an automated call processing system where the system would allow the user to cancel or purchase the product or service without speaking to an agent.

In one embodiment of the invention, the system makes the determination as to whether it would be worthwhile to attempt to have a human agent attempt to sell the caller a particular product or service based on such factors as: (1) whether it would be more profitable over time to have the caller retain a first product or service, or to buy a new product or service; (2) whether an account associated with the call has been profitable in the past; (3) whether the predicted chances of persuading the caller to replace the first product or service with a new product or service are relatively good (this may be determined, for example, using known data modeling techniques in conjunction with data that is related to the relevant account and/or caller).

For example, in one embodiment of the invention, the system is configured for receiving incoming calls from callers wishing to cancel one or more existing insurance policies. In response to receiving a particular call, the system determines whether it would be worthwhile to have a human agent attempt to: (1) convince the caller not to cancel an existing insurance policy; and/or (2) sell the caller an alternative product or service. The system may also be configured to determine whether it would be advantageous to simply allow the caller to cancel the existing insurance policy without speaking to a human operator. These decisions may be based, for example, on: (1) the past profitability of the insurance policy; (2) the estimated lifetime value of the existing insurance policy; (3) the estimated lifetime value of one or more potential replacement policies; and/or (4) the estimated probability of successfully convincing the caller to retain their existing insurance policy; and (5) the estimated probability of successfully convincing the caller to purchase one or more potential replacement policies. In one embodiment of the invention, if the system determines that the estimated lifetime value of one or more potential replacement policies is greater than the estimated lifetime value of the existing insurance policy, the system determines to route the system to a human representative who would then attempt to sell the caller the one or more potential replacement policies.

The Automated Call Processing Module 200 and the Call Assignment Module 300 are discussed in greater detail below.

Automated Call Processing Module

FIG. 4 is a flow chart depicting an automated call processing module 200 according to one embodiment of the invention. As may be understood from this figure, at beginning Step 210, the system requests that the caller confirm that they wish to take the requested action. If the system determines, at Step 220, that the caller has confirmed that they wish to take the requested action, the system proceeds to Step 240 where it executes the requested action. However, if the system determines, at Step 220, that the caller has not confirmed that they wish to take the requested action, the system proceeds to Step 230, where it transfers the call to a customer service representative for processing.

In one embodiment of the invention, the system is configured to automatically process the cancellation of certain very low value insurance policies without human intervention. In this embodiment, at Step 210, the system requests that the customer confirm that they wish to cancel their insurance policy. If the customer confirms that they wish to cancel the policy, the system proceeds to Step 240 where it cancels the policy substantially without, and preferably entirely without, human intervention. However, if the system determines, at Step 220, that the customer has not confirmed that they wish to cancel the insurance policy, the system proceeds to Step 230 where it transfers the call to a customer service representative for processing.

As noted above, in one embodiment of the invention, the functionality described above is useful in automatically canceling low-value insurance policies (or other services) without substantial (and preferably entirely without) human intervention. In one embodiment, this reduces the overall cost associated with processing these cancellations.

Call Assignment Module

As noted above, in one embodiment of the invention, if the Call Routing Module 100 determines, at Step 120, that the value of an incoming call is not below a threshold value, the system proceeds to Step 130 where it executes a Call Assignment Module 300. FIG. 5 is a flow chart depicting an exemplary Call Assignment Module 300 according to one embodiment of the invention.

As may be understood from FIG. 5, when executing the Call Assignment Module 300, the system first proceeds to Step 310, where it determines whether the incoming call is a high priority value call. The system may do this, for example, by comparing the call value determined at Step 110 (which, in one embodiment of the invention, is a numeric value) with a first predetermined threshold value. If the value of the call is above this first threshold value, the system determines that the call is a "high priority" call and proceeds to Step 320 where it routes the call to a first group of agents for processing. However, if the value of the call is not above the first threshold value, the system determines that the call is not a high priority call and advances to Step 330.

At Step 330, the system determines whether the call is a medium priority call. In one embodiment of the invention, the system does this by comparing the call value determined at Step 110 (which, in one embodiment of the invention, is a numeric value) with a second pre-determined threshold value, which in one embodiment of the invention is lower than the first threshold value. If the call value is above this second threshold value, the system concludes that the call is a "medium priority" call and proceeds to Step 340 where it routes the call to a second group of agents for processing. However, if the call value is not above the second threshold value, the system determines that the call is a low priority call and advances to Step 350, where it routes the call to a third group of agents for processing.

In the manner described above, in one embodiment of the invention, the Call Assignment Module 300 serves to direct calls to different groups of agents based upon the priority of the calls. In one embodiment of the invention, the priority of the calls corresponds directly to the value of the call determined at Step 110. However, the priority of a call may be determined in any other appropriate way.

Techniques for Forming Agent Groups

In one embodiment of the invention, each agent from a pool of two or more agents is assigned to a first, second, or third agent group based upon the agent's past performance in performing one or more particular tasks. For example, in one embodiment of the invention, agents are assigned to the various groups of agents based upon their past performance in: (1) persuading customers not to cancel a service; (2) persuading customers to retain a service for an extended period of time; (3) persuading customers to enroll in an alternative service; and/or (4) persuading customers to purchase an alternative product. More particularly, in one embodiment of the invention that is directed to processing calls related to the cancellation of insurance policies, agents may be assigned to one (or more) of the first, second, and third groups of agents, for example, based upon their past performance in: (1) persuading customers not to cancel an existing insurance policy; and/or (2) persuading customers to retain an existing insurance policy.

In a particular embodiment of the invention, when dividing a pool of two or more available agents into various groups of agents, the system first assesses each agent's past performance in performing one or more particular tasks, such as the tasks mentioned above. In one embodiment of the invention, the system then assigns each agent a numerical "performance rating". Once this is done for all of the agents within a pool, the agents are ranked on the basis of their assigned performance rating.

Next, the system determines how many agents are needed within each particular agent group. The system may do this by agent group size requirements that have been entered manually into the system by a human group coordinator. Alternatively, the system may use historical data to estimate a predicted number of incoming "high value" calls that are to be handled by agents on a particular shift. The system may then use additional historical data, or other types of data, to estimate the number of agents needed to handle the estimated number of "high value" calls. The system then repeats this process to estimate the number of agents needed to handle the pre-determined number of "medium value" and "low value" calls.

In one embodiment of the invention, all (or a majority of) "high value" calls are preferably handled by an agent group that is made entirely of (or primarily of) the highest performing agents from an available pool of one or more agents. In one embodiment of the invention, this agent group is referred to as a first group of agents. To form the first group of agents in this embodiment of the invention, the system identifies the number of agents needed to handle the predicted number of "high value" calls, and then assigns this number of top-ranked agents to fill the first group of agents. For example, if the system determines that seven agents are needed to process "high value" calls for a particular shift, the system will assign the seven highest ranked agents to fill the first group of agents for that particular shift.

In one embodiment of the invention, the system follows a similar approach to assigning agents to the group of agents that is to handle "medium value" calls, which in one embodiment of the invention is referred to as a second group of agents. In this embodiment of the invention, to form the second group of agents, the system identifies the number of agents needed to handle the predicted number of "medium value" calls, and then assigns this number of the remaining top-ranked agents (i.e., the top-ranked agents that remain after the first agent group has been filled) to fill the second group. For example, if the system determines that ten agents are needed process "medium value" calls for a certain shift, and if the system has assigned the first seven agents to the first group of agents, the system will assign the eighth through seventeenth highest-ranked agents to fill the second group of agents for that shift.

In one embodiment of the invention, the system follows a similar approach to assigning agents to the group of agents that is to handle "low value" calls, which in one embodiment of the invention is referred to as a third group of agents. In this embodiment of the invention, to form the third group of agents, the system identifies the number of agents needed to handle the predicted number of "low value" calls, and then assigns this number of the remaining top-ranked agents (i.e., the top-ranked agents that remain after the first and second agent groups have been filled) to fill the third group. For example, if the system determines that five agents are needed to process "low value" calls for a certain shift, and if the system has assigned the first seventeen agents to the first and second groups of agents, the system will assign the eighteenth through twenty-second highest-ranked agents to fill the third group of agents for that shift.

In one embodiment of the invention, the various agents are ranked on the basis of a performance rating score that takes into account one or more of the following: (1) the agent's average daily save rate percentage; (2) the agent's average daily saved revenue percentage; (3) the agent's average monthly persistency rate; and (4) the agent's sales revenue rate. In one particular embodiment of the invention, on a monthly basis, each agent is assigned a performance rating score that is based on all of these factors as calculated for the previous month. In one embodiment of the invention, all of these factors are weighted equally in assigning each agent a performance rating score. For example, in one embodiment of the invention, each agent's performance rating score is equal to the sum of the standardized values of: (1) the agent's average daily save rate percentage (e.g., for the previous month); (2) the agent's average daily saved revenue percentage (e.g., for the previous month); and (3) the agent's current average monthly persistency rate. In another embodiment of the invention, metrics are used to define the agent's performance in achieving the desired outcome from the call.

In one embodiment of the invention, an agent's daily save rate is equal to the number of calls that they "save" within a day divided by the number of calls that they handled within that same day that were eligible to be saved. Thus, if, in a particular day, an agent handled 200 calls that were eligible to be saved, and if the agent saved 100 of those eligible calls, the agent would have a daily save rate of 0.5, and a daily save rate percentage of 50%.

In one embodiment of the invention, an agent's daily saved revenue value is equal to the amount of revenue that an agent saved within a particular day (e.g., by persuading customers not to cancel an existing service) divided by the amount of revenue that the agent could have saved if they would have saved every call that they handled on that particular day. Accordingly, if, in a particular day, a particular agent saved 50 calls corresponding to a total of $1,000 worth of revenue, but handled a total of 200 calls corresponding to a total of $4,000 worth of revenue, the agent's daily saved revenue value for that particular day would be 0.25 and the agent's daily saved revenue percentage would be 25%.

In a particular embodiment of the invention, an agent's persistency rating is a numerical value based on the total number of months that the agent's previous "saves" remain in effect. In this embodiment of the invention, a "save" remains in effect for as long as the account or service at issue in a particular "saved" call remains in effect. For example, if a customer calls to cancel a particular insurance policy and an agent convinces the customer to not cancel the policy, the agent is credited with saving the call. If the customer then waits for six months after speaking with the agent to cancel the policy, the agent's "save" will be regarded as having remained in effect for six months.

In one embodiment of the invention, the various available agents are ranked based upon their performance rating score and then assigned to one or more groups of agents based upon this performance rating score. For example, in one embodiment of the invention, each agent of a plurality of agents (e.g., the total pool of available agents) is assigned to a particular one of a plurality of agent groups (e.g., 3 groups) based upon their performance rating score. In a particular embodiment, the available agents that are ranked within the top 30% of these agents (e.g., based on their performance rating score) are assigned to a "high-value call" agent group. Similarly, the available agents that are ranked within the bottom 30% of the agents (e.g., based on their performance rating score) are assigned to a "low-value call" agent group. All of the other agents are then assigned to a "medium-value call" agent group. In one embodiment, all new agents are placed into the "low-value call" agent group until their performance rating score is sufficient to place them in another group.

Call Routing Techniques

As may be understood from the discussion above, and particularly in light of FIG. 5, in one embodiment of the invention, the system routes calls so that high priority calls are handled by a group of agents that are the highest performing at handling a particular type of call (e.g., a call requesting cancellation of an insurance claim). Similarly, medium priority calls are handled by a second-most talented group of agents, and low priority calls are handled by a third-most talented group of agents.

In one embodiment of the invention, once a call is routed to a particular group of agents, the call is placed in a queue so that the call is handled by the first available agent within that group, regardless of the agent's performance rating. However, in another embodiment of the invention, calls are automatically routed for processing to the available agent within the group whose performance best matches the value of the call.

In a particular embodiment of the invention, if a call has been in a queue for a particular group of agents for a predetermined period of time, the call is automatically redirected to a "backup" group of agents for processing. For example, in one embodiment of the invention, once a call has been in a queue for the first group of agents for more than two minutes, the call is automatically redirected to the second group of agents for processing. Similarly, once a call has been in a queue for the second group of agents for more than two minutes, the call is automatically redirected to the first group of agents for processing. By the same token, once a call has been in a queue for the third group of agents for more than two minutes, the call is automatically redirected to the second group of agents for processing. As will be understood by one skilled in this field in light of this disclosure, this setup for handling overflow calls may be modified to suit the needs of the particular system at issue.

For example, in one embodiment of the invention, the system first assesses the value of a particular call and then identifies the agent within a particular group of agents whose performance best matches the value of the call. If this agent is unavailable to take the call, the system then identifies the agent within that particular group of agents whose performance is the second best match for the call (e.g., based on the call's assigned value). If this agent is unavailable to take the call, the system then identifies the agent within the particular group of agents whose performance is the third best match for the call (e.g., based on the call's assigned value).

In one embodiment, the system continues this process until it either has identified an agent who is available to take the call (in which case the system routes the call to the identified available agent for handling), or until the system has determined that none of the agents within the particular group are available to take the call. In the latter case, the system proceeds to a next group of agents (e.g., the next highest or lowest group of agents) where it repeats the process described above until the system has either identified an agent who is available to take the call, or until the system has determined that none of the agents within that particular group are available to take the call. The system continues this process for each group until it either has identified an agent who is available to take the call or it has determined that none of the agents within any of the particular groups are available to take the call. In the latter case, the system may, for example: (1) instruct the caller to call back later; (2) take a message from the caller which would then be returned in the form of an outbound call; (3) forward the call to an automated call processing system for handling; or (4) handle the call in any other appropriate way.

In a particular embodiment of the invention, if only one agent is available to handle a particular type of call, the system may be configured to choose which of a plurality of calls to route to the agent for handling. The system may then route the remaining calls to be handled in any appropriate alternative manner. For example, in one embodiment of the invention, if only one agent is available to handle two incoming calls, the system may determine which of the two incoming calls has a higher priority value (e.g., based on the respective predicted lifetime values of the respective accounts associated with the incoming calls). The system would then route the higher priority call to the available agent for handling, and route the lower priority call to an automated call processing system for handling.

CONCLUSION

Many modifications and other embodiments of the invention will come to mind to one skilled in the field to which this invention pertains having the benefit of this disclosure. For example, while one embodiment of the invention is described above as a system for routing incoming phone calls, the techniques above may also be applied to a system for routing other types of real-time or non-real-time correspondence, such as instant message and e-mail exchanges or other types of electronic correspondence. Similarly, the above techniques may also be applied to directing customers from a physical line of customers (e.g., a line of customers waiting for help at a customer service department) to an appropriate customer service representative. Similarly, the above techniques may also be applied for assigning outbound calls (e.g., sales calls) to agents with varying performance levels.

In addition, although one embodiment of the invention was described above as providing three different groups of agents for handling different types of calls, the system may use more or less than three agent groups to handle these calls. For example, in one embodiment of the invention, the system uses only two groups to handle all incoming calls.

Also, as may be understood by one skilled in the relevant field, the system may be configured to not include an automated call processing feature. For example, in one embodiment of the invention, after executing the step of determining a value of the call at Step 110, the system proceeds directly to the step of executing the Call Assignment Module 300. Thus, in this embodiment of the invention, Steps 120 and 140 (the steps of determining whether a call is below a threshold value and, if so, executing the Automated Call Processing Module) are eliminated.

In light of the above, it should be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What we claim is:

1. A call processing system of a sponsor organization that is configured for fielding incoming telephone calls from a caller who has decided to take a course of action that is against the interests of the sponsor, comprising:
  (a) selecting at least one such incoming caller for direct human interaction with a human agent of the sponsor; and
  (b) selecting such human agent for his probable ability to establish a relationship-based affinity with the caller within the duration of the call to persuade such caller to change his mind and choose a course of action instead that is in the interests of the sponsor.

2. The call processing system of claim 1, wherein such caller is dissuaded by the agent from cancelling a product or service previously purchased by the caller from the sponsor and retains such product or service instead.

3. The call processing system of claim 1, wherein such caller is persuaded by the agent to purchase a product or service from the sponsor.

4. The call processing system of claim 1, wherein such caller is persuaded by the agent instead to purchase a product or service from the sponsor in substitution of a product or service previously purchased by the caller from the sponsor.

5. The call processing system of claim 1, wherein the agent's probable affinity for persuading the caller who has decided prior to the call to take a course of action that is against the interests of the sponsor to choose instead a desired course of action that is in the interests of the sponsor is characterized by the agent's past performance in persuading a caller to change his mind and adopt a course of action desirable to the sponsor.

6. The call processing system of claim 5, wherein the agent's past performance comprised persuading customers not to cancel a service.

7. The call processing system of claim 5, wherein the agent's past performance comprised persuading customers to retain a service for an extended period of time.

8. The call processing system of claim 5, wherein the agent's past performance comprised persuading customers to enroll in an alternative service.

9. The call processing system of claim 5, wherein the agent's past performance comprised persuading customers to purchase an alternative product.

10. The call processing system of claim 5, wherein the agent's past performance is measured by that agent's saved revenue rate performance.

11. The call processing system of claim 5, wherein the agent's past performance is measured by that agent's sales rate performance.

12. The call processing system of claim 5, wherein the agent's past performance is measured by that agent's sold revenue rate performance.

13. The call processing system of claim 1, wherein the sponsor's agents are organized within groups comprising a plurality of agents of similar level of ability for persuading callers to change their minds and choose a course of action instead that is desirable to the sponsor.

14. The call processing system of claim 13, wherein the sponsor agent group comprises a highest performing agents group.

15. The call processing system of claim 13, wherein the sponsor agent group comprises a lowest performing agents group.

16. The call processing system of claim 1, wherein the product comprises an insurance policy.

17. The call processing system of claim 1, wherein the product comprises a debt cancellation product.

18. A call processing system of a sponsor organization that is configured for fielding incoming telephone calls from a caller, comprising:
   (a) selecting at least one such incoming caller for direct human interaction with a human agent of the sponsor; and
   (b) selecting such human agent based upon an estimation of the probability that he can establish an affinity-based relationship with the caller within the duration of the call to persuade that caller not to cancel a product or service of the sponsor organization, to retain the product or service of the sponsor organization for an extended period of time, or to purchase an alternative product or service of the sponsor organization.

19. The call processing system of claim 18, wherein the estimation of the probability that the agent can establish the affinity-based relationship with the caller to persuade the caller to adopt the course of action in the interest of the sponsor organization comprises the agent's daily save rate.

20. The call processing system of claim 18, wherein the estimation of the probability that the agent can establish the affinity-based relationship with the caller to persuade the caller to adopt the course of action in the interest of the sponsor organization comprises the agent's daily saved revenues.

21. The call processing system of claim 18, wherein the estimation of the probability that the agent can establish the affinity-based relationship with the caller to persuade the caller to adopt the course of action in the interest of the sponsor organization comprises the agent's persistency rating.

22. The call processing system of claim 18, wherein estimations are made for at least two agents for their respective probability that the agent can establish the affinity-based relationship with the caller to persuade the caller to adopt the course of action in the interest of the sponsor organization, and a comparison is made between those estimated values to select the specific agent to interact with the caller.

23. The call processing system of claim 18, wherein the product comprises an insurance policy.

24. The call processing system of claim 18, wherein the product comprises a debt cancellation product.

* * * * *